No. 611,726.  
Patented Oct. 4, 1898.
E. WISHART.  
EGG BEATER.  
(Application filed Jan. 14, 1898.)
(No Model.)
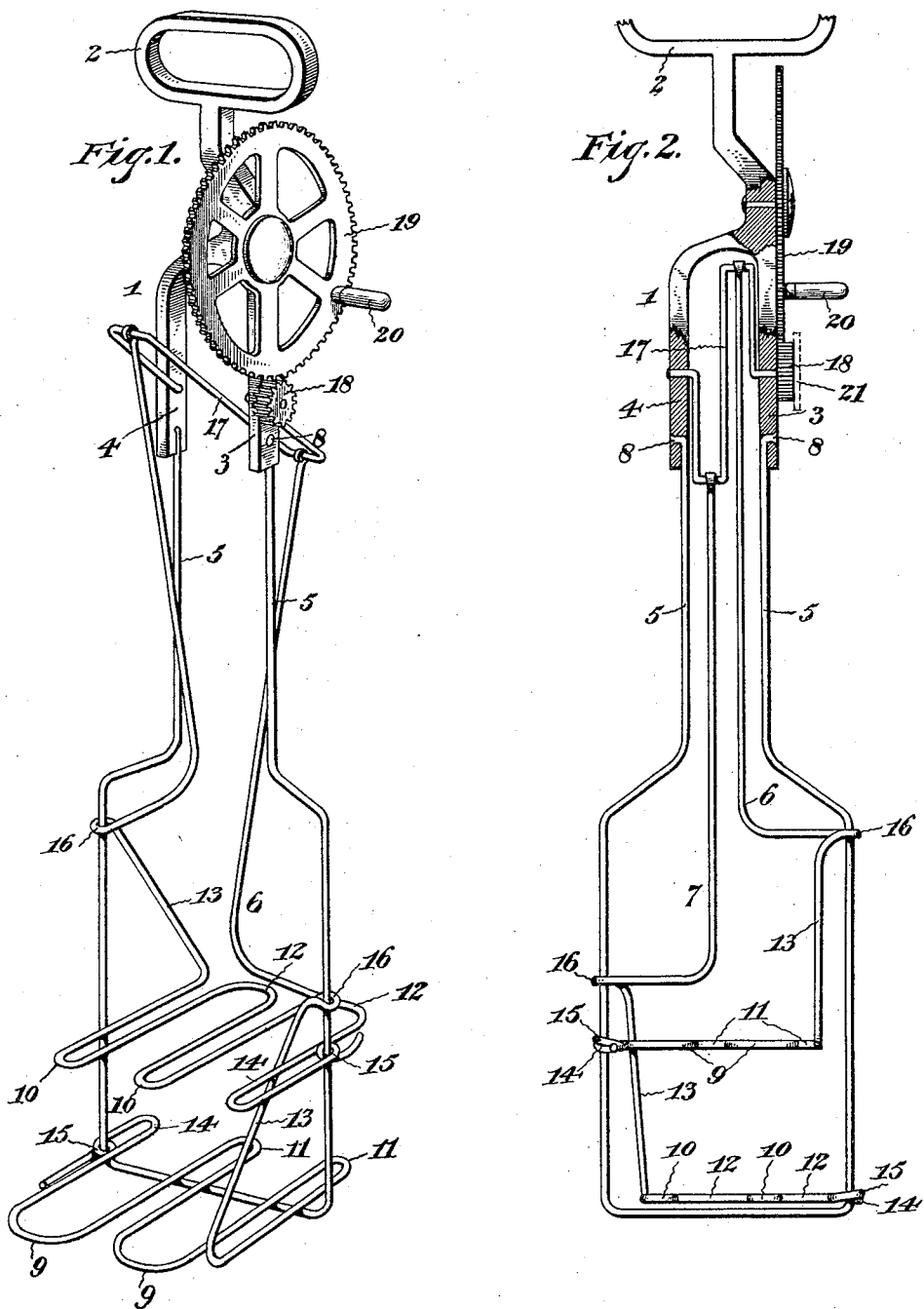
Witnesses  
Robt. E. Crump  
J. J. Riley
Edward Wishart, Inventor  
By his Attorneys,  
C. A. Snow & Co.

UNITED STATES PATENT OFFICE.

EDWARD WISHART, OF WATERFORD, PENNSYLVANIA.

EGG-BEATER.

SPECIFICATION forming part of Letters Patent No. 611,726, dated October 4, 1898.

Application filed January 14, 1898. Serial No. 666,689. (No model.)

*To all whom it may concern:*

Be it known that I, EDWARD WISHART, a citizen of the United States, residing at Waterford, in the county of Erie and State of Pennsylvania, have invented a new and useful Egg-Beater, of which the following is a specification.

The invention relates to improvements in egg-beaters.

The object of the present invention is to improve the construction of egg-beaters and to provide a simple, inexpensive, and efficient device capable of effectively agitating cream, eggs, or other liquids with little or no splashing.

The invention consists in the construction and novel combination and arrangement of parts, as hereinafter fully described, illustrated in the accompanying drawings, and pointed out in the claims hereto appended.

In the drawings, Figure 1 is a perspective view of an egg-beater constructed in accordance with this invention. Fig. 2 is a side elevation, partly in section.

Like numerals of reference designate corresponding parts in both figures of the drawings.

1 designates a main or supporting frame provided at its outer end with a handle 2 and having its inner portion forked to provide a pair of parallel arms 3 and 4, to which are secured the sides of an oblong guide-frame 5. The inner portions of the sides of the frame 5 are inwardly offset to form narrow connecting portions disposed substantially in alinement with the arms 3 of the supporting-frame. The guide-frame 5 receives a pair of reversely-reciprocating dashers 6 and 7, and it has the inner terminals of its sides bent outward at right angles and secured in recesses of the arms 3 and 4 of the frame 1. The ends 8 of the sides of the frame 5 are enlarged to form heads, as clearly illustrated in Fig. 2 of the accompanying drawings, and the recesses of the arms 3 and 4 extend along the inner faces thereof and terminate at their inner ends in perforations. The heads or enlargements of the ends 8 retain the latter in the said perforations; but any other suitable means may be employed for connecting the guide-frame with the frame 1.

Each agitator, which is constructed of a single piece of wire or other suitable material, consists of a stem and a series of transverse loops or fingers formed by serpentine bends. The loops are alternately wide and narrow, the wide loops 9 of the dasher 6 being located opposite the narrow loops 10 of the dasher 7 and the narrow loops 11 of the dasher 6 being arranged opposite the wide loops 12 of the other dasher. By this construction the dashers are enabled to pass each other, and when reciproctated by the means hereinafter described they effectively agitate cream or eggs, cutting the liquid, which clings to the loops and prevents splashing.

The loops or fingers of each dasher are connected at one side of the guide-frame with the stem 13, and the outer side of the loop at the opposite side of the guide-frame is extended to form a short loop 14 and is coiled around the frame 5 to provide a guide-eye 15. The wire after being coiled to form the guide-eye 15 is extended to increase the length of the short loop 14.

Each stem 13 is offset laterally and coiled to form a guide-eye 16, and is then offset inwardly to arrange it at the center of the egg-beater and bring it in line with one of the loops of a double-crank shaft 17. The terminals of the double-crank shaft are journaled in suitable bearing perforations or recesses of the arms 3 and 4, and its loops are connected with the inner terminals of the stems 13 of the dashers, whereby the latter will be reversely reciprocated when the crank-shaft is rotated. One end of the crank-shaft is extended beyond the frame 1 and has a pinion 18 fixed to it and meshing with a gear or master wheel 19, which is provided with a handle 20, by means of which the egg-beater is operated. The gear-wheel 19 is mounted on a suitable journal or stub-shaft, which is provided with a head for engaging the outer face of the large gear-wheel. The pinion 18 is preferably thickened, as shown, to provide a wide periphery, so that the gear-wheel cannot get out of mesh with it; but any other suitable means may be provided for effecting this result, such as an exterior plate 21, arranged as illustrated in Fig. 2 of the drawings and projecting beyond the periphery of the pinion to provide a circumferential flange. The arm 3 of the frame 1 is substantially in line with the stem thereof, being only slightly laterally offset therefrom in order to bring the gearing close to the center of the egg-beater and provide a straight side for the same.

The invention has the following advantages: The egg-beater is simple and comparatively inexpensive in construction, and it is capable of rapidly agitating a liquid without splashing the same. The reversely-reciprocating dashers are adapted to pass each other, owing to the alternate arrangement of wide and narrow loops which cut a liquid and cause the same to cling to them, and the relative diameters of the gearing may be varied to obtain the necessary rapidity of reciprocation of the dashers. The outer portion of the guide-frame receives the guide-eyes of the dashers and may be made of any desired width, so that the desired number of loops or bends of the dashers may be obtained, and any variation in width of the lower or outer portion of the guide-frame and the dashers does not interfere with or necessitate any alteration in the construction or arrangement of the gearing, as the inner portions of the sides of the guide-frame are inwardly offset to bring them in alinement with the arms 3 and 4 of the frame 1. The dashers are guided directly on the sides of the frame, and by locating the eyes 15 and 16 of each dasher in the distinctly different horizontal planes the dashers are caused to reciprocate in a direct line.

Changes in the form, proportion, and minor details of construction may be resorted to without departing from the spirit or sacrificing any of the advantages of this invention.

What I claim is—

1. In an egg-beater, the combination of an oblong frame having parallel sides, the reversely-reciprocating dashers provided with fingers or loops and mounted to slide directly on the sides of the oblong frame, each dasher being slidingly connected with both sides of the frame and the points of connection being reversely arranged and located in distinctly different horizontal planes, whereby each dasher will be supported at two different points along the frame and will be caused to reciprocate in a straight line, and means for reciprocating the dasher, substantially as described.

2. In an egg-beater, the combination of an oblong guide-frame having parallel sides, and a pair of reversely-reciprocating dashers constructed of wire and comprising stems outwardly offset in opposite directions and provided with guide-eyes 16 sliding directly on the sides of the frame, and the transverse series of loops or fingers coiled around the sides of the frame to form eyes 15, each dasher being connected with both sides of the frame and having its eyes 15 and 16 located in distinctly different horizontal planes, whereby it will be caused to reciprocate in a straight line, substantially as described.

In testimony that I claim the foregoing as my own I have hereto affixed my signature in the presence of two witnesses.

EDWARD WISHART.

Witnesses:
CHAS. F. BOLARD,
J. A. BOLARD.